(12) United States Patent
Limber

(10) Patent No.: US 8,775,793 B2
(45) Date of Patent: Jul. 8, 2014

(54) FLEXIBLE NODE IDENTITY FOR TELECOM NODES

(75) Inventor: Andreas Limber, Linkoping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 671 days.

(21) Appl. No.: 12/918,333

(22) PCT Filed: Feb. 20, 2008

(86) PCT No.: PCT/SE2008/050199
§ 371 (c)(1),
(2), (4) Date: Aug. 19, 2010

(87) PCT Pub. No.: WO2009/105002
PCT Pub. Date: Aug. 27, 2009

(65) Prior Publication Data
US 2010/0318881 A1 Dec. 16, 2010

(51) Int. Cl.
*H04L 29/06* (2006.01)
*G06F 21/73* (2013.01)
*G06F 21/44* (2013.01)
*G06F 21/57* (2013.01)
*G06F 21/70* (2013.01)
*G06F 21/50* (2013.01)

(52) U.S. Cl.
CPC ............... *G06F 21/73* (2013.01); *G06F 21/44* (2013.01); *G06F 21/57* (2013.01); *G06F 21/70* (2013.01); *G06F 21/50* (2013.01)
USPC .......................................................... 713/155

(58) Field of Classification Search
CPC ......... G06F 21/44; G06F 21/50; G06F 21/57; G06F 21/70; G06F 21/73
USPC ..................................... 726/26; 713/193, 155
See application file for complete search history.

(56) References Cited

U.S. PATENT DOCUMENTS

| 7,051,200 | B1* | 5/2006 | Manferdelli et al. .......... 713/153 |
| 7,546,357 | B2* | 6/2009 | Manchester et al. .......... 709/220 |
| 2002/0065958 | A1* | 5/2002 | Rocray et al. ................. 709/331 |
| 2003/0084306 | A1* | 5/2003 | Abburi et al. ................. 713/188 |
| 2003/0163712 | A1* | 8/2003 | LaMothe et al. .............. 713/189 |
| 2004/0003271 | A1* | 1/2004 | Bourne et al. ................ 713/193 |
| 2004/0044629 | A1 | 3/2004 | Rhodes et al. |

(Continued)

FOREIGN PATENT DOCUMENTS

WO    03/021403 A1    3/2003
WO    2006/006030 A1    1/2006

*Primary Examiner* — Michael S McNally
(74) *Attorney, Agent, or Firm* — Coats & Bennett, P.L.L.C.

(57) ABSTRACT

Features of a node (800) is enabled/disabled under a license between a node vendor and a service provider. A license manager (810) enforces the license to appropriately enable and disable the node features. The license, which includes credentials for authorizing the features and a logical name of the node, is encrypted with an encryption CHWID upon node installation. The secret encryption CHWID is generated based on the components (820) that make up the node (800) at installation using an algorithm. To activate the features, an activation CHWID is generated using a same or similar algorithm and compared against the encryption CHWID. If they are equal, the credentials are decrypted and the features are activated. If they are not equal but the difference is small, the credentials are decrypted, and optionally, the encryption CHWID is reset based on the activation CHWID. If the difference is large, the entire node license is reinstalled.

25 Claims, 8 Drawing Sheets

(56) References Cited

U.S. PATENT DOCUMENTS

| | | | |
|---|---|---|---|
| 2004/0133792 A1* | 7/2004 | Dublish et al. | 713/193 |
| 2005/0102528 A1* | 5/2005 | Tan et al. | 713/193 |
| 2005/0149204 A1* | 7/2005 | Manchester et al. | 700/1 |
| 2006/0026604 A1* | 2/2006 | Tan et al. | 719/331 |
| 2006/0106728 A1 | 5/2006 | Yellai et al. | |

* cited by examiner

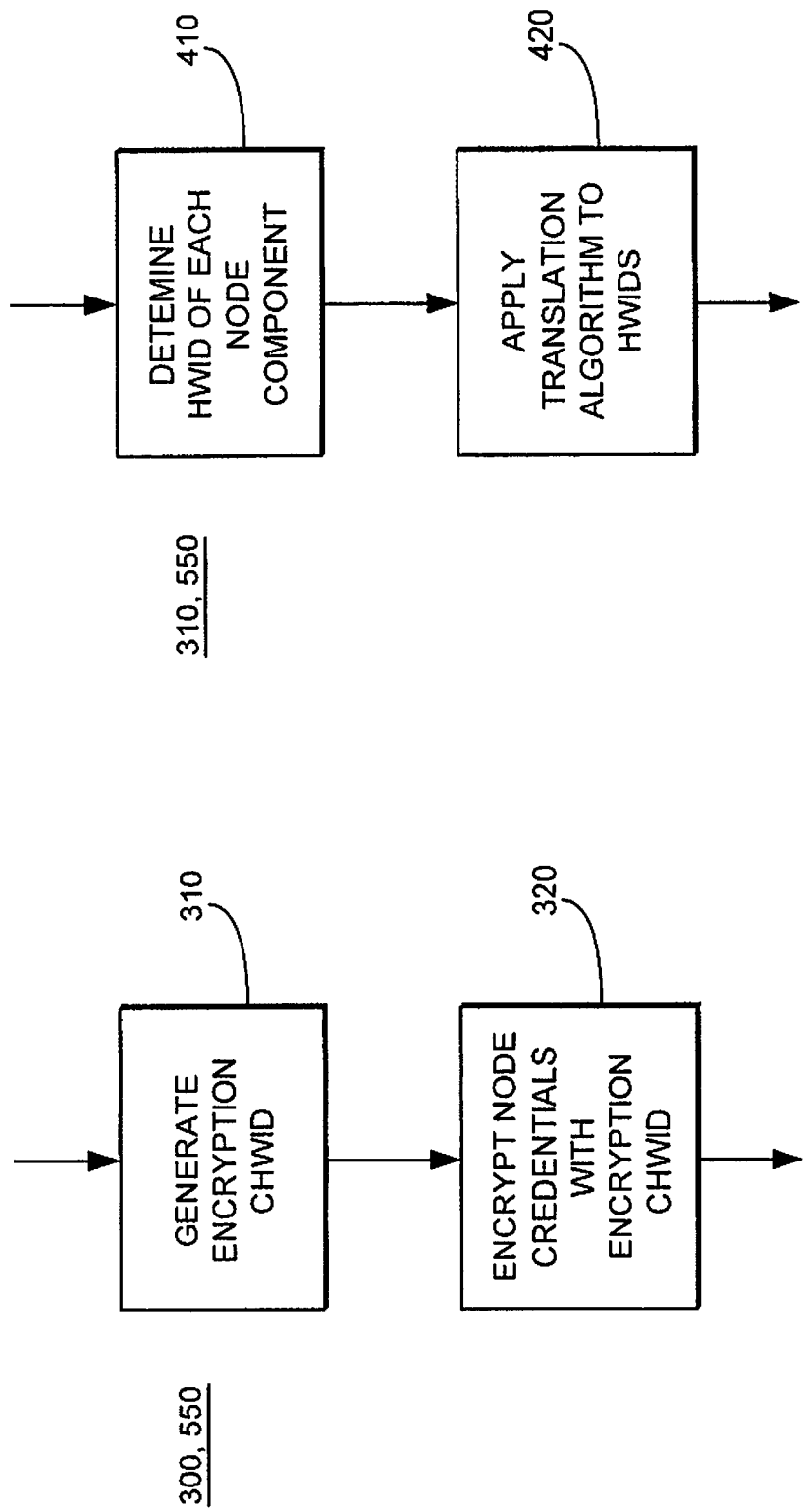

FLEXIBLE NODE IDENTITY FOR TELECOM NODES

TECHNICAL FIELD

The technical field of this disclosure generally relates to systems and methods for managing a license for a telecommunications (or simply telecom) node.

BACKGROUND

A telecom node vendor supplies a telecom node to a service provider who in turn provides telecom services to its customers using the telecom node. The node may be a radio base station, a radio network controller, a network gateway, etc. The node can include configurable hardware components that implements various content delivery features such as VoIP, multimedia (video, audio) content, and connection-oriented cell phone services. The hardware components can also implement data delivery modulation features such as 16QAM, 64QAM, OFDM, QPSK, etc.

The telecom node is supplied to the service provider under a license from the vendor that restricts or prohibits some features that the node can provide and enables other features of the node to be activated for the service provider to use in providing the services to its customers. As an example, the service provider may have paid for the capability to provide only the VoIP and connection-oriented cell phone services using only 16QAM modulation. To enforce the terms of the license, a license manager, i.e., a data processing device and/or software, operates on or within the node to enable/disable the node features consistent with the terms of the license.

The license can be tied to a unique identity of the node which is itself tied to the physical structure of the node. The unique node identity, usually expressed as a number, is sometimes implemented as a read-only value recorded in a programmable read-only memory (PROM) accessible through the back plane of a physical housing, such as a cabinet or a subrack, that physically houses the hardware components of the node. FIG. 1 illustrates a configuration of a node 100 that includes one or more hardware components 120-1, 120-2, . . . 120-N, a license manager 110, and a PROM 130 all contained within a housing 105. The components 120, the license manager 110, and the PROM 130 are all connected via the backplane of the housing. The unique node identity, which is contained as a read-only value in the PROM 130, is important for enabling/disabling various features under the terms of the license, both on the network level and in the node itself.

If the license is tied to the identity of the node, then the license manager 110 can simply verify the node identity read from the PROM 130 via the backplane and enable all hardware components 120-1, 120-2 . . . 120-N contained within the housing 105 for the service provider to use if the node identity is valid. One disadvantage of this configuration is that co-locating nodes of different systems such GSM/WCDMA/LTE in the same cabinet would not be allowed.

Also, tying the license to the node identity presents an opportunity for license misuse. First, the node identity can be easily spoofed simply by reading the PROM 130 and copying the value to a PROM in another housing structure. Second, if there are extra hardware slots available in the housing 105, other non-authorized hardware components can be added. For example, the service provider may add a component that implements 64QAM modulation to allow for a faster data delivery than 16QAM modulation. Since only the node identity is verified rather than the identities specific to the hardware components of the node 100, the added hardware component can be enabled which violates the terms of the license.

One way to mitigate this type of license misuse is to tie the license to the specifically licensed configuration of the node including the housing 105 and the individual hardware components 120-1, 120-2 . . . 20-N. In FIG. 1, each hardware components 120 has a unique individual hardware ID HWID-1, HWID-2 . . . HWID-N which is set when the hardware component is manufactured. One example is a serial number assigned to the component. The component's HWID can be accessed, for example, through a query received through the backplane of the housing 105 by the license manager 110. If the license is tied to the specifically licensed configuration of the node 100, then when a new component is added to the available slot of the housing 105, the license manager 110 will detect the mismatch and disable the new component from being used by the service provider or disable the node 100 altogether.

However, a strict application of tying the node configuration to the license presents problems. There are occasions where new components being incorporated into the node are legitimate. It is not unusual for a hardware component to fail which must be replaced with a new component with the same or similar capabilities and features. For example, the component 120-1 which provides VoIP communication capabilities may fail, in which case, a new component to provide the same VoIP services to the end user customers will be needed. Another legitimate circumstance is when the vendor provides upgrades to the node that fixes or other wise addresses problematic issues that are present with the existing node configuration. The upgrades may be in the form of a replacement and/or an additional hardware component. Since the new component has a different HWID, the license manager will detect the mismatch and disable the new component or the entire node in both legitimate circumstances, and the license needs to be "reset".

The license reset process is inconvenient and/or expensive to the service provider, the end user, and to the vendor. When the license is reset, the revenue stream from providing the services to the end users is interrupted which is costly to the service provider. The end users are inconvenienced due to the service disruption. Finally, the vendor is inconvenienced since it must provide the necessary services, such as sending a technician to the service provider's site, to reset the license which is both resource and time consuming.

In addition, tying the license to the configuration of the node including the identity of the physical housing and the components presents problems. In LTE for example, components of the node are allowed to span multiple physical housings such as subracks and cabinets. In this instance, the license that is tied to the housing and the components physically contained in the housing will be incomplete if some of the components are physically separate from the housing since not all components will be accounted for in the license. This again presents opportunities for license misuse.

It is desirable to use a unique identity for a node for license management purposes that is tied to the configuration of the node's hardware components so that license misuse can be prevented. It is also desirable to allow the minor configuration changes to the node so that expensive, cumbersome, and time consuming process of resetting the node license can be avoided.

SUMMARY

In one or more example embodiments, a node, e.g., a telecom node, includes an undisclosed number of hardware circuit boards, i.e., components, each with a unique HWID, e.g., a serial number, that is readable. The components can be dispersed physically, i.e., the components can span across multiple housing structures such as subracks and cabinets. The node is supplied under a license which includes features that are enabled/disabled depending on the terms of the license. The license terms is enforced by a license manager which runs on or within the node.

When the node is first installed, the HWIDs of the components are processed through a secret algorithm that generates a secret combined hardware ID (CHWID) of the node. The CHWID includes at least configuration data and a configuration check code. The configuration data is data that results from processing the HWIDs through a secret data processing function. Thus, the configuration data of the CHWID reflects the hardware component configuration of the node. The size of the configuration data, which can be predetermined, is preferred to be undisclosed. The configuration check code is generated based on the configuration data, i.e., the configuration check code corresponds to the configuration data. The configuration check code, the size of which is preferred to be predetermined and undisclosed, can be used to provide tolerance to small changes to the configuration to the node so that a complete reset of the node license is not necessary.

The CHWID is then used to encrypt the node credentials, which correspond to the terms of the license. The node credentials include certificates used for authorization towards the core network so that features of the node can be enabled or disabled depending on the license terms. The credentials also include a logical name of the node which is a sequence of alphanumeric characters such as "MyNodeName" given to the node by the network administrator. The certificates can be tied to the logical name of the node. Since the CHWID, which is secret to everyone and everything except the node itself, is used to encrypt the node credentials (certificates, logical name) that are loaded into the node, the credentials identifying and authorizing the node as itself can never be moved or copied to another node once the node is installed. This is illustrated in FIGS. 2A and 2B and described further below.

When the node starts up, the node features are activated based on the license terms. Since the node credentials are encrypted on install, the credentials must be decrypted before the licensed features can be activated. This process generally follows two acts—generating the CHWID and decrypting the node credentials with the CHWID. For ease of reference, the CHWID generated for encryption at install described above will be referred to as the "encryption CHWID" and the CHWID generated for feature activation will be referred to as the "activation CHWID". The encryption and activation CHWIDs are generated at different points in time.

The process to generate the activation CHWID can be identical or very similar to the process to generate the encryption CHWID. Since both processes are secret to external entities (except perhaps to an authorized entity such as the administrator), security is maintained. If the activation CHWID and the encryption CHWID are the same, there is high confidence that the node is valid, and thus, the node credentials can be decrypted—with either the activation or the encryption CHWID (both are the same)—for authorization and activation.

Even when the activation CHWID and the encryption CHWID are not the same, the node credentials can still be decrypted using the encryption CHWID provided that the difference is within a tolerance limit which can be predetermined. As indicated above, a defective component can be replaced or an upgraded component may be installed. Both component replacement and upgrade activities are legitimate activities that technically results in the configuration of the node being changed. But since the resulting changes are not so great, the difference between the activation CHWID and the encryption CHWID should not be so great as to fall outside the tolerance limit.

On the other hand, the difference could fall outside the tolerance limit. This can occur when the service provider adds components with totally new features or wholesale replaces the existing components. When the tolerance limit is exceeded, then the node configuration can be so different that the license is no longer applicable. When this occurs, the license may be reset to the new node configuration, for example, by the vendor going through a reinstallation procedure to generate a new encryption CHWID and encrypting the node license credentials with the new encryption CHWID.

The following is recognized. As noted above, an individual legitimate configuration change activity (component replacement/upgrade activities) by itself will not cause the difference between the activation CHWID and the encryption CHWID to fall outside the tolerance limit. However, an accumulation of such legitimate activities over time can result in the difference falling outside the limit. Then an unnecessary license reset process may be performed since the node configuration is legitimate.

To prevent such unnecessary reset of the license, the activation CHWID is set to be the new encryption CHWID and the node credentials are encrypted with the new encryption CHWID provided that a predetermined amount of time has passed since the encryption CHWID was previously set or reset. This is in recognition of the fact that legitimate configuration change activities as those described above occur relatively infrequently. Normally, the vendor provides upgrades at regular intervals. Also, the mean-time-between-failures of the components are generally known. The predetermined amount of time can be set based on this knowledge.

BRIEF DESCRIPTION OF THE DRAWINGS

The foregoing and other objects, features, and advantages will be apparent from the following more particular description of preferred non-limiting example embodiments as illustrated in the accompanying drawings in which reference characters refer to the same parts throughout the various views. The drawings are not necessarily to scale, emphasis instead being placed upon illustrating the principles of the invention.

FIG. 3 illustrates a flow chart of a method setting up a license for a node;

FIG. 4 illustrates a flow chart of a method for generating a CHWID of a node;

DETAILED DESCRIPTION

In the following description, for purposes of explanation and not limitation, specific details are set forth such as particular architectures, interfaces, techniques, etc. in order to provide a thorough understanding of the present invention.

However, it will be apparent to those skilled in the art that the present invention may be practiced in other embodiments that depart from these specific details. Those skilled in the art will be able to devise various arrangements which, although not explicitly described or shown herein, embody the principles of the invention and are included within its spirit and scope.

In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, it will be appreciated that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
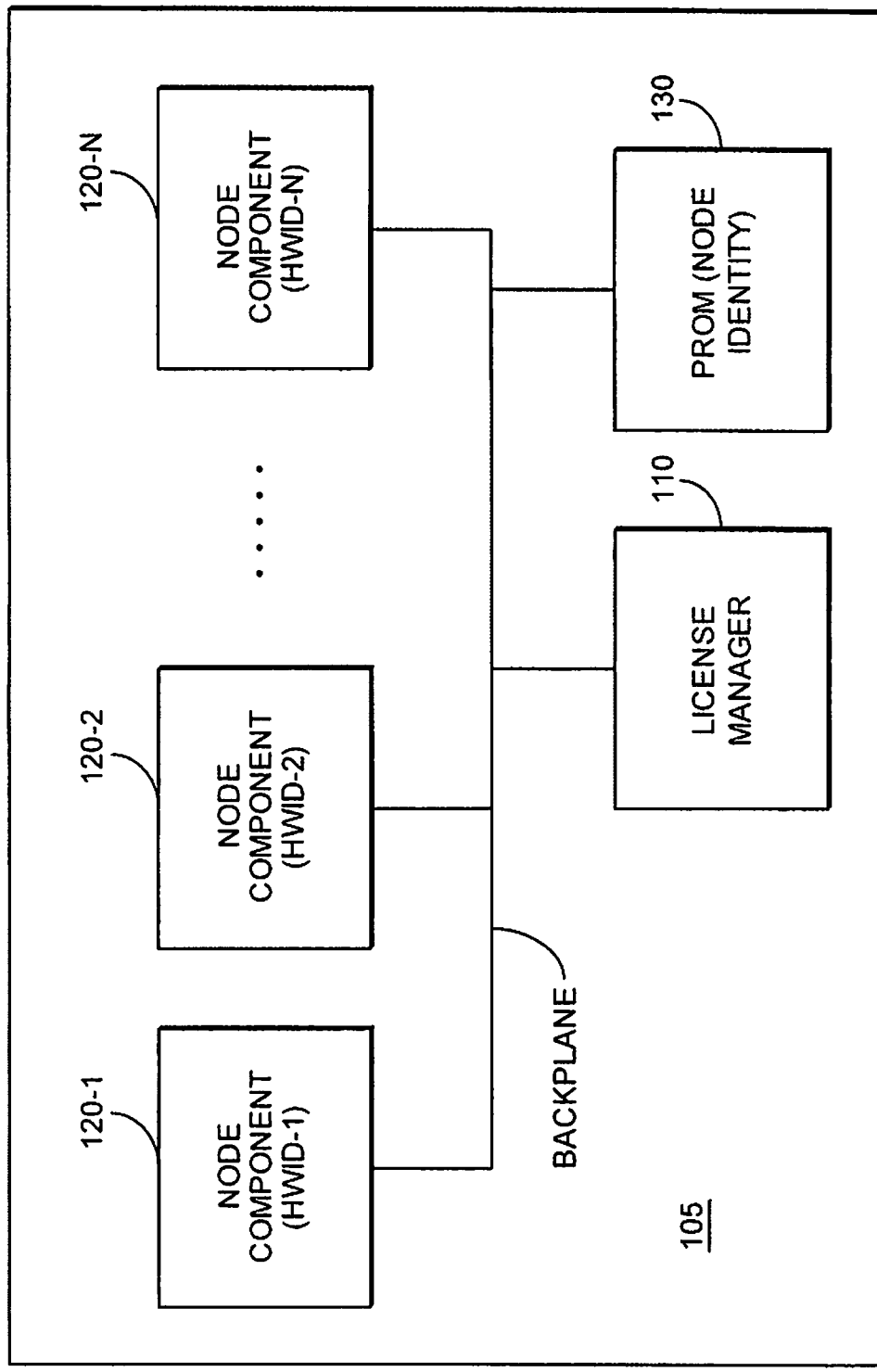
FIG. 1 illustrates a composition of an example node.
Figure 8:
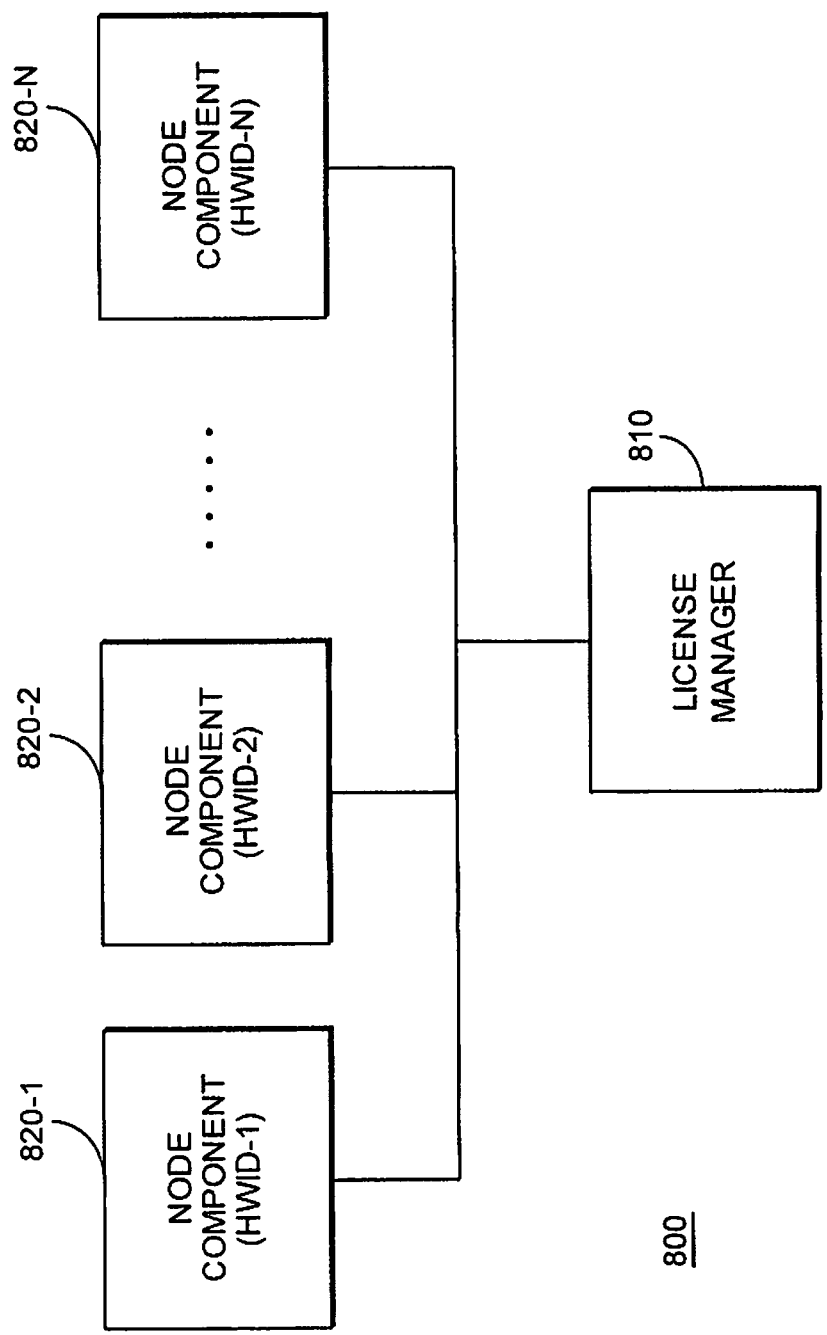
FIG. 8 illustrates a composition of another example node.

A block diagram of a telecom node 800 is illustrated FIG. 8. Examples of telecoms include LTE, WCDMA, and GSM. The node 800 includes one or more hardware node components 820-1, 820-2 . . . 820-N operatively connected to a license manager 810. Unlike the node 100 in FIG. 1, the components 820-1, 820-2 . . . 820-N are not necessarily housed together physically in a single structure. These components can span across multiple housing structures such as subracks and cabinets. The connection to the license manager 810 and between the components 820-1, 820-2 . . . 820-N may be any accomplished via any combination of wired and/or wireless links including optical fiber, copper cable, Ethernet, microwave, etc.

Each component 820-1, 820-2 . . . 820-N is identifiable with individual hardware ids HWID-1, HWID-2 . . . HWID-N that can be read by or otherwise can be made known to the license manager 810. In a preferred embodiment, HWID of each component is unique and can be set during the component manufacturing process. The HWID can be a number or a string of alphanumeric characters. The license manager 810 itself may be a component of the node 800 with its own HWID. The license manager 810 can be configured to implement methods to manage the license of the node 800 as described in detail further below.

When the node 800 is installed or completely reset, the HWID-1, HWID-2 . . . HWID-N of the node components 820-1, 820-2 . . . 820-N are collected and processed through a data translation algorithm to generate a combined hardware ID (CHWID) of the node as broadly illustrated in FIG. 2A. The resulting CHWID can be a sequence of alphanumeric characters and can be of a predetermined length. It is preferred that length of the CHWID be as long as possible, for example, at least 2048 bits. It is also preferred that the CHWID be kept secret such that it is not available external to the node, except perhaps to a trusted entity such as the network administrator.

The CHWID can then be used to encrypt the node credentials, i.e., the certificates used for authorization towards the core network. Included here is a logical name such as "MyNodeName" given to the node by the network administrator. In an embodiment, the certificates are tied to the logical node name. For ease of reference, the CHWID generated for use in encrypting the node credentials is referred to as the "encryption CHWID."

When generating the encryption CHWID, the HWIDs of all components can be collectively processed through the data translation algorithm. For example, the HWIDs can be processed through a secret hashing algorithm to create a hashed checksum as the encryption CHWID. The encryption CHWID can also include an undisclosed number of parity bits. The parity bits can serve as a type of a check code. Other check code types are contemplated.

Figure 2A:
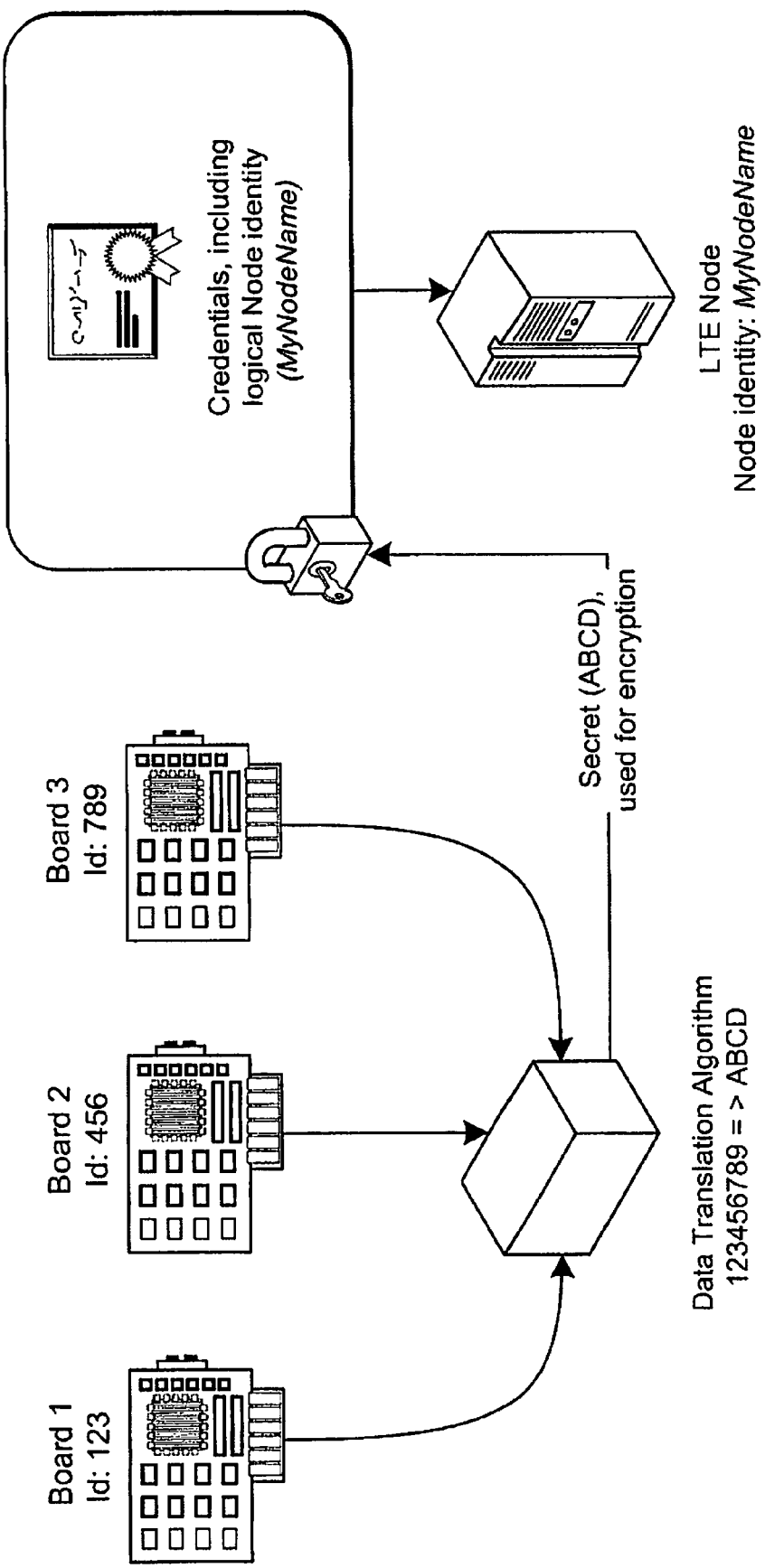
FIGS. 2A and 2B illustrate a flow for enabling and disabling node features through credentials of a node license.
Figure 2B:
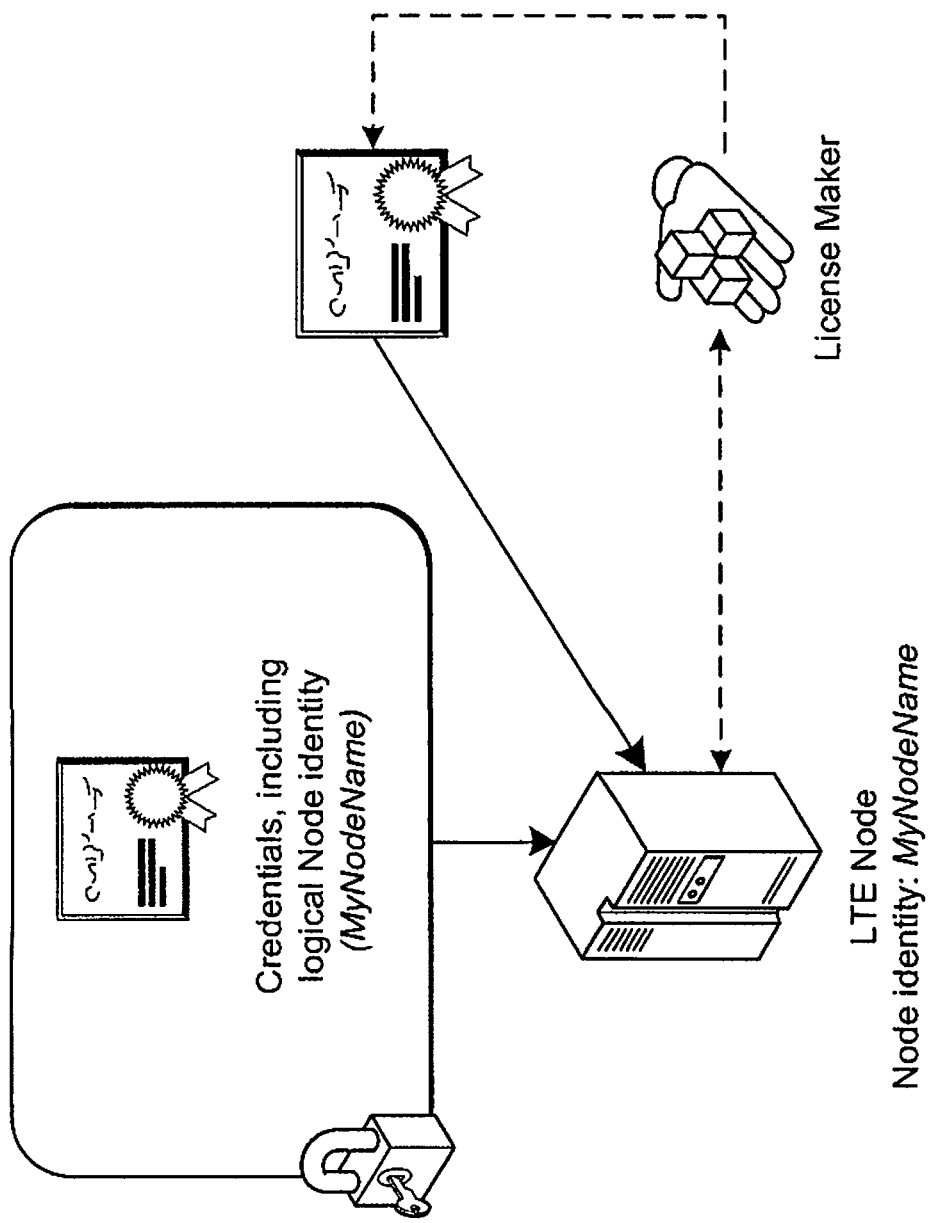

The encryption CHWID, which is secret to everyone and everything except to the node itself, can be used to encrypt the node credentials (certificates and logical name) that are loaded into the node as illustrated in FIG. 2B. The credentials identifying and authorizing the node as itself can never be moved to another node once installed and encrypted. Licenses for enabling features in the node can be made out to the logical node name, loaded into the node, and then enforced by the license manager having authority over the node. The license manager can be implemented as any combination of software, hardware, and firmware process(es).

When the features of the node 800 is to be activated, an activation CHWID can be generated in a manner identical or similar to the manner in which the encryption CHWID is generated. If the activation CHWID is the same as the encryption CHWID, the node's configuration has not changed, and thus the credentials can be decrypted and the appropriate features of the node under the license terms can be activated by the license manager 810.

When a node component 820 fails or is otherwise replaced and/or removed and/or when a new component is added, the configuration of the node 800 changes. When the node restarts or simply tries to regenerate the activation CHWID after the node configuration change, a mismatch occurs between the activation CHWID and the encryption CHWID. At this point, the license manager 810 can attempt to recreate the encryption CHWID using the check code. The amount of mismatch that can be detected and/or corrected depends on the robustness of the check code. In an embodiment, a tolerance limit for mismatch can be set by setting a size of the check code to a predetermined size. The size can be expressed in number of bits.

If the node's configuration changes too greatly—e.g., by replacing, adding and/or removing too many components—the mismatch tolerance will be exceeded which means that the attempt to recreate the encryption CHWID will fail and the node credentials cannot be decrypted. At this point, the node can be considered to be a different node such that the license is no longer valid and the node will not be authorized with the core network. The node will then have to be reset and given new credentials by a technician.

FIG. 3 illustrates a flow chart of an example method 300 to manage a license for a node 800. The method 300 in particular illustrate the acts to generate the encryption CHWID and encoding the node credentials with the encryption CHWID. The method begins by generating the encryption CHWID in act 310. FIG. 4 illustrates an example process to implement act 310. In this process, the HWIDs of every node component 820-1, 820-2 . . . 820-N are determined in act 410. For example, the license manager 810 can query the components 820-1, 820-2 . . . 820-N when the node 800 is first activated (powered-up, reset, etc.) and/or the license manager 810 itself is activated. As another example, each component 820-1, 820-2 . . . 820-N may report its corresponding HWID information to the license manager 810 when it is activated. After the HWIDs are determined, a translation algorithm is applied to the HWIDs to generate the encryption CHWID in act 420.

In an embodiment, the encryption CHWID includes encryption data and an encryption check code. It is preferred that the encryption data reflects the configuration of the node components 820-1, 820-2 . . . 820-N at the time the CHWID is generated. Also, it is preferred that the encryption check code correspond with the encryption data. An example correspondence between the encryption data and check code is explained with a simple illustration. Assume that the encryption data is a simple concatenation of the HWIDs—a sequence of concatenated HWID bits. Also assume that the translation algorithm includes a check code function that outputs a bit data of "0" or "1" when a total number of 1's in the configuration data is even (or odd). In this instance, the encryption CHWID includes the encryption data (concatenated sequence of HWIDs) and the encryption check code (parity bit). Since the encryption check code is dependent on the encryption data, the encryption check code corresponds to the encryption data.

While the single parity bit can be utilized as the encryption check code, its usefulness is limited since it can be mapped to many sequences, i.e., the mapping between the encryption data and the parity bit is not one-to-one. To be useful, robust schemes to generate the encryption data and corresponding encryption check code are preferred so that the mapping between any particular encryption data to the encryption check code is as close to one-to-one as possible. This improves security since the encryption CHWID can be trusted to a high degree.

In an embodiment, the translation algorithm is applied to the collection of HWIDs as a whole to generate the encryption CHWID. In another embodiment, the algorithm is applied individually to each HWID or a group of HWIDs and the results are combined to produce the encryption CHWID. Any combination of data manipulation algorithms such as hash, error detection, error correction, and encryption algorithms can form a part or a whole of the translation algorithm. Examples of such algorithms include a one-way compression algorithm, a trap-door algorithm, a geometric translation algorithm, SHA algorithms, a Whirlpool algorithm, a convolution algorithm and so on.

To the extent possible, it is preferred that the translation algorithm be unique to the node. That is, the translation algorithm used by the node 800 should not be used by another node in the network. Further, it is preferred that the algorithm be kept secret, except perhaps to an authorized external entity such as a network administrator. Together, security is enhanced by making it difficult to generate the same encryption CHWID by spoofing the HWIDs of the network components. In an alternative, the same translation algorithm can be used for multiple nodes of the network. However, if the translation algorithm also takes as input a seed value, i.e., a translation key, in addition to the HWIDs, then the algorithm can be made unique and/or secret by making the seed value unique and/or secret to the node 800.

The size of the encryption data can be predetermined and/or the size of the encryption check code can be predetermined. If both are predetermined, then the size of the encryption CHWID itself will be predetermined. The predetermined sizes can be expressed as number of bits, nibbles, bytes, words and so on. Further, the predetermined sizes need not be the same between the encryption data and the encryption check code. In an embodiment, a certain amount of changes to the node (components added/removed/replaced) is tolerated by setting the size of the encryption CHWID, and in particular, by setting the size of the encryption check code.

The encryption check code can be an error detection code and/or an error correction code. Error detection code examples include a checksum code, a cyclic redundancy code, a parity code and so on. Error correction code examples include a forward error correction (FEC) code, a convolutional code, a block code, a Hamming code, a Reed-Solomon code, a BCH code, a linear code, a Reed-Solomon code and so on. The configuration check code can simultaneously be both an error detection and correction code. For example, an error-correcting code can be constructed to correct all errors up to n bits and detect all errors up to 2n bits. Both the detection code and the correction code are generated based on the encryption data so that the encryption check code corresponds with the encryption data.

The translation algorithm can include configuration data generation and configuration check code generation functions. The configuration data generation function takes as input the HWIDs and outputs the configuration data, i.e., the encryption data. An example configuration data generation function which simply concatenates the HWIDs is described above. Another example is a hash function. A desirable feature of one or more hash functions is that the function can receive an input (HWIDs) of arbitrary length and output a hash sum (encryption data) of a fixed length. Even if the output size is relatively small, e.g., 32 bits, the likelihood of hash collision—two different inputs resulting in a same output—is remote. The output size may be set as needed. Further, the hash function may also be seeded with a hash key—the translation key—to uniquely correspond the translation algorithm to the node 800. Other configuration data generation functions are contemplated such as data encryption functions.

The configuration check code generation function takes as input the configuration data from the configuration data generation function and generates the corresponding configuration check code, i.e., the encryption check code, which can be a detection code and/or a correction code as described above. The detection/correction code may be generated as a single value for the entirety of the configuration data as a whole or the configuration data may be divided into data blocks and the check code may be generated for each data block.

Referring back to FIG. 3, the node credentials are encrypted with the encryption CHWID in act 320. The node credentials include certificates—use for authorization of node features consistent with the license terms for the node—and the logical name of the node. The logical name can be in a human readable text form such as "MyNodeName". The certificates can be made out to the logical name.

Figure 5A:
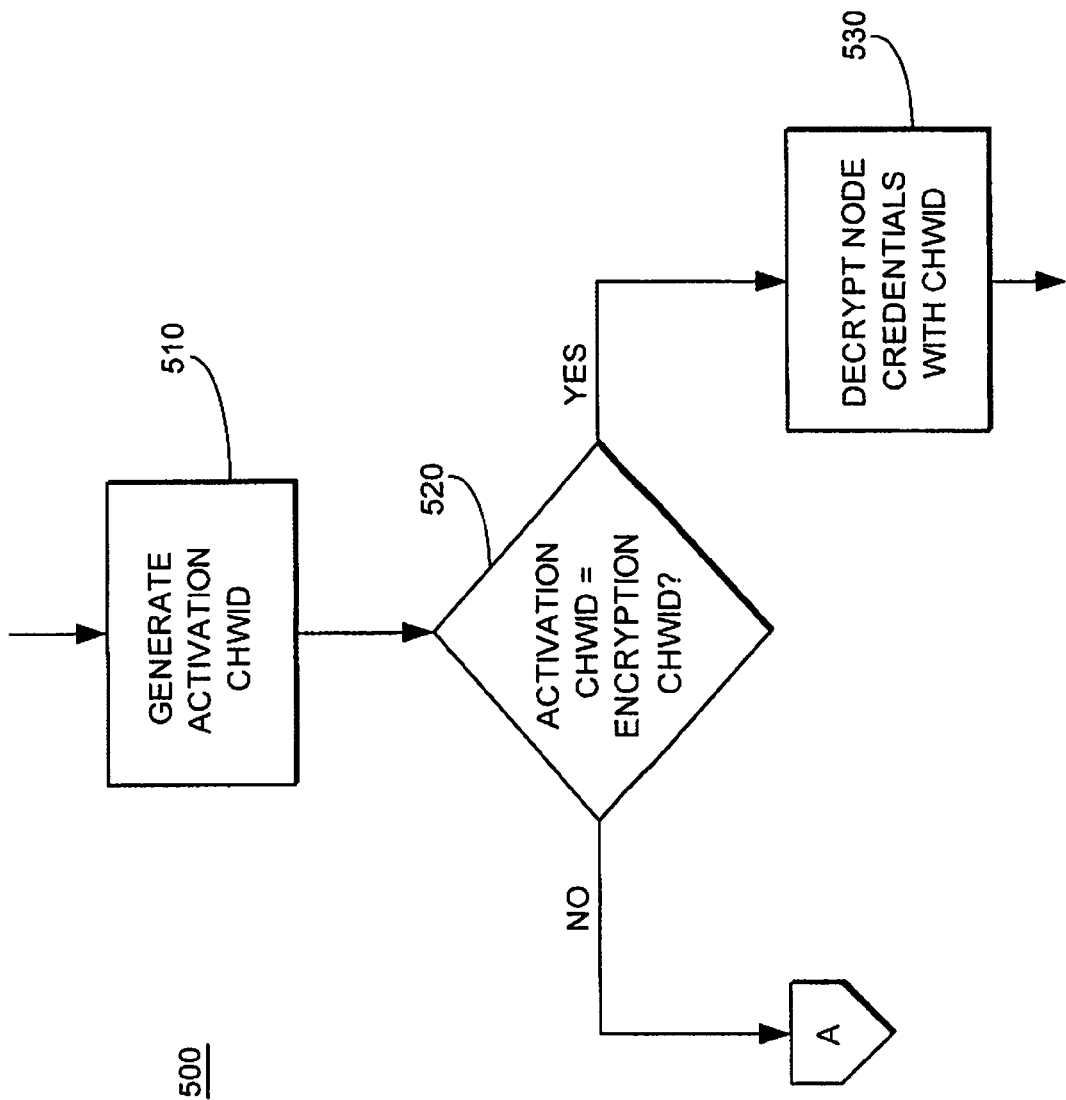
FIGS. 5A and 5B illustrate a flow chart of a method for a license managing for a node.
Figure 5B:
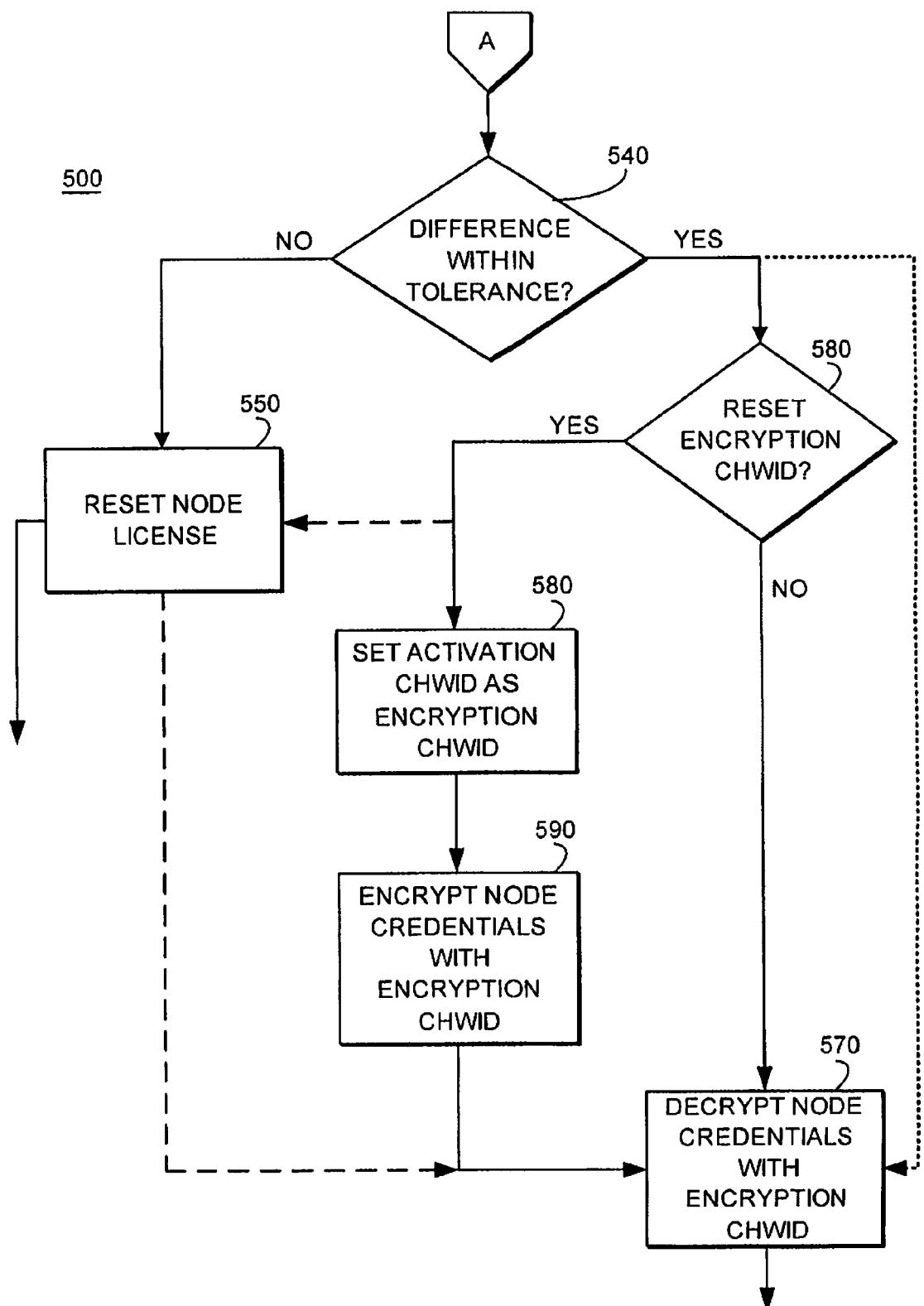
Figure 7:
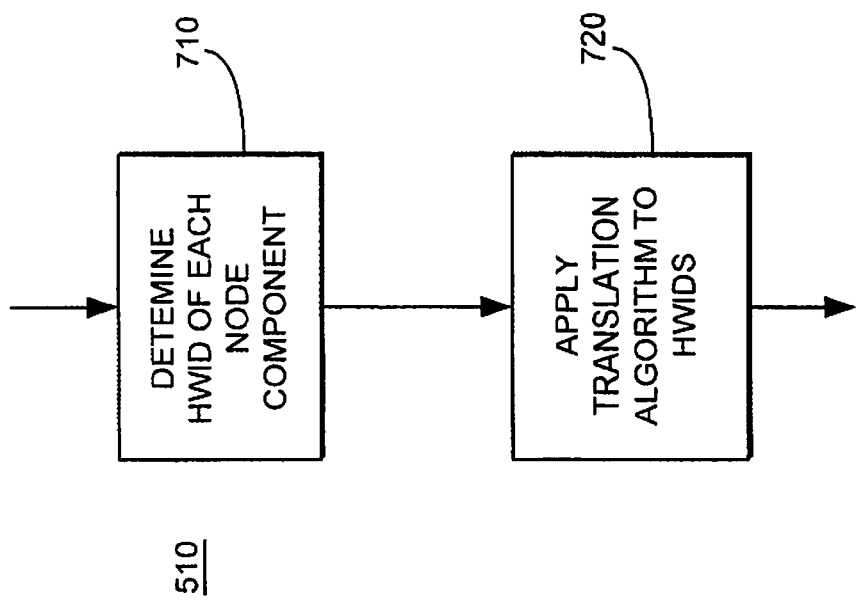
FIG. 7 illustrates a flow chart of a method for generating the activation CHWID of a node.

To activate the licensed features, the credentials must be decrypted. FIGS. 5A and 5B illustrate an example embodiment of a method to accomplish this task. In FIG. 5A, the method 500 begins in act 510 by generating an activation CHWID. FIG. 7 illustrates an example process to implement the activation CHWID generating act. The process begins in act 710 where the HWIDs of every node component 820 are determined. In act 720, a translation algorithm is applied to the HWIDs to generate the activation CHWID. Like the encryption CHWID, the activation CHWID includes activation data and an activation check code. The activation data reflects the configuration of the node when the activation CHWID is generated.

Note that FIGS. 7 and 4 are similar. It is preferred that acts 410 and 710 have identical input-output mapping with respect to each other. That is, given a same input (HWIDs), acts 410 and 710 will generate a same output (encryption data/activation data). The internal implementation of the acts need not be identical. There is a possibility that the current components can be relocated without any new components being added or existing components being removed. If a simple component relocation is not to be considered as a configuration change, then acts 410 and 710 should be insensitive to the order in which the HWIDs are provided as input.

In an embodiment, acts 420 and 720 also have identical input-output mapping with respect to each other. Then any changes to the node 800 configuration will be reflected since the activation CHWID will not be equal to the encryption CHWID.

In another embodiment, act 720 is slightly different from act 420. In this embodiment, the activation CHWID includes the activation data generated in act 710. However, the activation check code is not set to correspond to the activation data. Instead, the activation check code is set to equal to the encryption check code. As explained in more detail below, this allows the encryption CHWID to be recreated from the activation CHWID if such need arises. Note that even in this embodiment, any changes to the node 800 configuration will be reflected in the resulting activation CHWID since the activation data will be different from the encryption data.

Referring back to FIG. 5A, after the current CHWID is generated in act 510, the activation CHWID and the encryption CHWID are compared in act 520. If they are the same—i.e, configuration has not changed—then the node credentials are decrypted in act 530 using the activation or the encryption CHWID. If the activation CHWID and the encryption CHWID are not the same, then the method proceeds to act 540 in FIG. 5B to determine whether the difference between the activation CHWID and the encryption CHWID is tolerable. For example, a new component 820—such as additional RAM—may have been added to the node 800 since the CHWID previously was generated. As another example, a defective component is replaced. It is preferred that such minor configuration change be tolerated to avoid the resetting of the node license. This is desirable since a license reset process is typically expensive, cumbersome, and time consuming.

In an embodiment to implement act 540, the difference between the activation CHWID and the encryption CHWID is determined. If the difference is within a predetermined tolerance range, then the difference can be deemed tolerable. In this embodiment, the degree of configuration change to the node is reflected in the amount of difference between the activation CHWID and the encryption CHWID. This can be accomplished by selecting appropriate combination of functions implemented in acts 410 and 420 and in acts 710 and 720.

As an example of determining the difference, the activation and/or the encryption check codes can be error detection codes useful for detecting errors up to n bits. Any difference between the activation CHWID and the encryption CHWID can be treated as bit errors and "n" can be set to be the predetermined tolerance limit in bits. If the error is n bits or less, then the difference can be deemed to be tolerable. Note that the tolerance range limit can be set by setting the size of the configuration check code—longer the code, greater the error detection capability.

Figure 6:
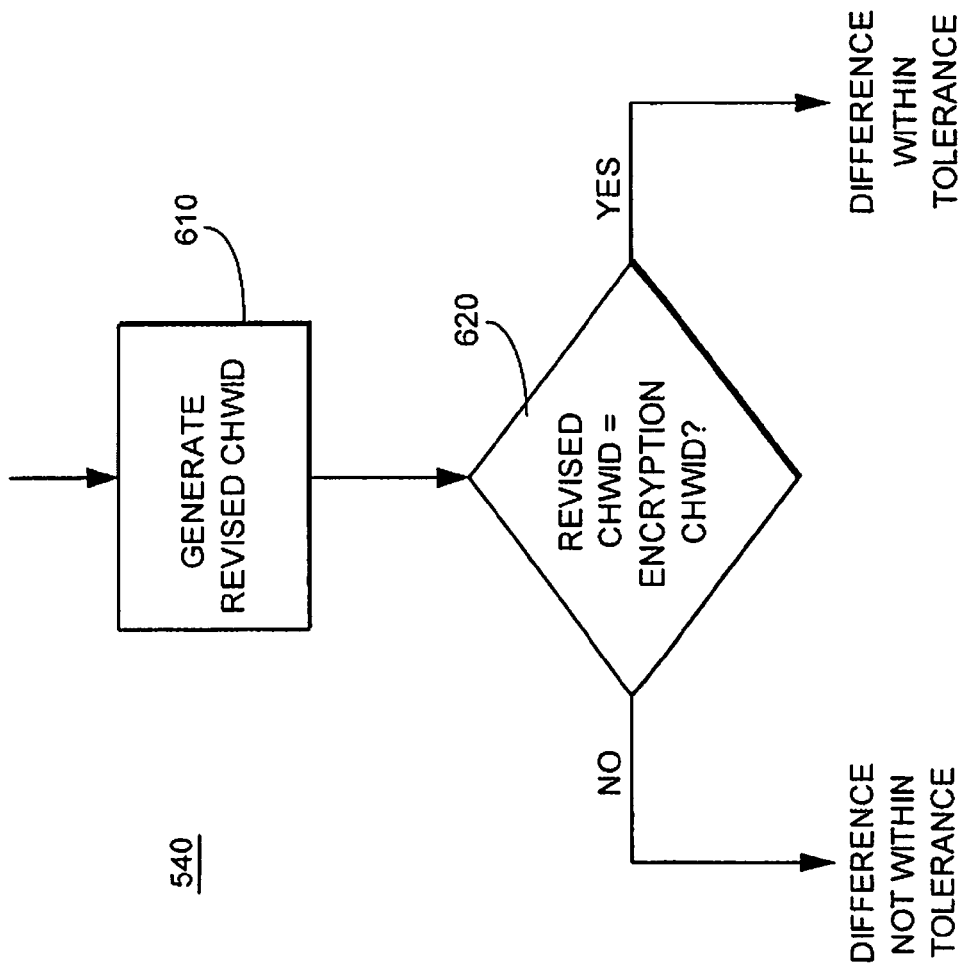
FIG. 6 illustrates a flow chart of a method for determining whether a difference between an encryption CHWID and an activation CHWID is tolerable.

In another embodiment to implement act 540, the check codes can be error correction codes useful for correcting errors up to n bits. FIG. 6 illustrates an example process to implement this embodiment. Again, any difference between the activation CHWID and the encryption CHWID can be treated as bit errors. In this embodiment, a revised CHWID is generated by applying an error correction function to the activation CHWID in act 610. If the errors are within n bits, then the error should be correctable and the revised CHWID should be equal to the encryption CHWID. If they are equal, the difference is deemed tolerable in act 620 and intolerable otherwise. Again, the tolerance range can be set by setting the size of the configuration check code—longer the code, greater the error correction capability.

In the embodiment described above for act 720 in which the activation check code of the activation CHWID corresponds to the encryption data of the encryption CHWID, the error correction code is especially useful. In this instance, any small difference between the encryption data and the activation data—reflecting corresponding small changes to the node configuration—should be readily correctable using the encryption check code.

Referring back to FIG. 5B, if the difference is not tolerable, the license of the node may need to be completely reset—that is reinstalled—according to the changed configuration of the node 800 in act 550. Acts 310 and 320 of FIG. 3 can be run to reset the node license. In this scenario, the node has changed so much such that it is in effect considered to be a different node in which the license no longer applies. For security purposes, it may be desirable to treat this as a new license installation so that the resetting is processed through an external authorizing entity.

If the difference is tolerable, then the method can directly proceed to act 570 to decrypt the node credentials decrypted with the encryption CHWID. Alternatively, it is preferred that gradual changes to the node over time be tolerated, for example, to allow for legitimate component upgrades or replacements of defective components. In this alternative, if the difference between the activation CHWID and the encryption CHWID is tolerable, then it is determined whether the encryption CHWID should be reset to reflect the configuration of the node 800 as it currently stands.

The decision to reset the encryption CHWID can be made if a predetermined amount of time has passed since the encryption CHWID was previously set or reset. In one embodiment, the encryption CHWID can be reset by entirely reinstalling the node license from scratch in act 550—i.e., perform acts 310 and 320 of FIG. 3—and the node credentials can be decrypted with the new encryption CHWID in act 570. In this instance, act 550 may be run automatically without the need for an external authorizing entity. Note that if the activation check code does not correspond to the activation data, then resetting the node through act 550 would be required.

On the other hand, if the activation data and corresponds with the activation check code, the activation CHWID may be used—a complete license reinstallation is not necessary. Instead, the activation CHWID can be set to be the new encryption CHWID in act 580 and the node credentials can be encrypted with the new encryption CHWID in act 590. Then the node credentials can be decrypted in act 570.

One or more embodiments provide multiple advantages. From a security perspective, solutions depend on the fact that a node in the network is unique and can be trusted. Encrypting certificates and logical name using the node's own hardware ensures this trust. Also telecom nodes typically require licenses to establish how much of the hardware capacity the customer has paid for using. At certain points in time, new licenses can be made out to the node. However, this process is time-consuming. Thus, it is desirable to limit the re-licensing events to be as few as possible. Two examples of these events are when the node is initially deployed and when additional hardware is installed.

Here, a bundle of licenses are deployed to the node by a license making process ("License Maker"). The License Maker typically allocates license keys to the node using its logical name. The logical name can be trusted since they are encrypted using the CHWID. The internal licensing functions in the node unlock features after the keys have been deployed, depending on what licenses are in place.

One advantage is that no additional hardware solution is needed to uniquely identify the node—the existing hardware is sufficient. Also, the amount of changes to the node before it is regarded as a new/different node can be set dynamically using the check code. Further, how much of the hardware which is allowed to be replaced over a period of time can be set. Yet further, manual licensing processes can be kept to a minimum. These and other advantages lead to lower costs, decreased lead time for licensing, increased flexibility for maintenance and thus higher customer satisfaction.

Although the description above contains many specificities, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby. Furthermore, no element, component, or method act in the present disclosure is intended to be dedicated to the public.

What is claimed is:

1. A method to manage features for a network node in accordance with a license, the network node configured to provide one or more services to a user device according to the license, the method comprising:
   generating an encryption combined hardware ID (CHWID) associated with the node based on hardware IDs (HWIDs) of hardware components of the node; and
   encrypting node license credentials with the encryption CHWID;
   wherein the credentials include certificates used for authorization of the node to enable and disable the features for the node in accordance with the license, the encryption CHWID includes encryption data and an encryption check code, the encryption data reflects a configuration of the hardware components of the node at a time when the encryption CHWID is generated, and the encryption check code corresponds to the encryption data.

2. The method of claim 1, wherein generating the encryption CHWID includes:
   determining a hardware ID (HWID) of each hardware component of the node; and
   applying a translation algorithm to the HWIDs of the components to generate the encryption CHWID.

3. The method of claim 2, wherein, in applying the translation algorithm to the HWIDs, the translation algorithm is applied to a collection of the HWIDs as a whole.

4. The method of claim 2, wherein the translation algorithm includes any one or more of a one-way compression algorithm, a trap-door algorithm, a geometric translation algorithm, SHA algorithms, and a Whirlpool algorithm.

5. The method of claim 2, wherein the translation algorithm is unique to the node, secret to the node, or both.

6. The method of claim 5, wherein a seed of the translation algorithm is unique to the node, secret to the node, or both.

7. The method of claim 1, wherein a size of the encryption data is a first predetermined size, a size of the encryption check code is a second predetermined size, or both.

8. The method of claim 1, wherein the encryption check code is one or both of an error detection code and an error correction code.

9. The method of claim 8, wherein:
   when the encryption check code is the error detection code, the encryption check code is at least one of a cyclic redundancy code, a checksum code, and a parity code based on the encryption data; and
   when the encryption check code is the error correction code, the encryption check code is at least one of a forward error correction (FEC) code, a convolutional code, a block code, a Hamming code, a Reed-Solomon code, a BCH code, a linear code, and a Reed-Solomon code based on the encryption data.

10. The method of claim 1, further comprising:
    generating an activation CHWID of the node;
    determining whether the encryption CHWID and the activation CHWID are equal;
    decrypting the node credentials with the encryption CHWID when it is determined that the encryption CHWID and the activation CHWID are equal; and
    determining whether a difference between the encryption CHWID and the activation CHWID is tolerable when it is determined that the encryption CHWID and the activation CHWID are not equal, wherein:
    the activation CHWID includes activation data and an activation check code,
    the activation data reflects the configuration of the hardware components of the node at a time when the activation CHWID is generated, and
    the activation check code corresponds to the activation data or corresponds to the encryption data of the encryption CHWID.

11. The method of claim 10, wherein generating the activation CHWID includes:
    determining the hardware ID (HWID) of each of one or more components of the node; and
    applying a translation algorithm to the HWIDs of the components to generate the activation CHWID.

12. The method of claim 10, wherein the activation check code and the encryption check code are error detection codes, and wherein determining whether the difference between the encryption CHWID and the activation CHWID is tolerable comprises determining whether the difference is within a predetermined tolerance range.

13. The method of claim 10, wherein the activation check code and the encryption check code are error correction codes, and wherein determining whether the difference between the encryption CHWID and the activation CHWID is tolerable comprises:
    generating a revised CHWID by applying an error correction algorithm to the activation CHWID; and determining whether the encryption CHWID and the revised CHWID are equal;
determining that the difference is tolerable when it is determined that the encryption CHWID and the revised CHWID are equal; and
determining that the difference is not tolerable when it is determined that the encryption CHWID and the revised CHWID are not equal.

14. The method of claim 10, further comprising:
resetting the node license when it is determined that the difference between the encryption CHWID and the activation CHWID is not tolerable; and
wherein resetting the node license comprises:
determining the HWID of each of the one or more components of the node;
applying the translation algorithm to the HWIDs of the components to generate a new encryption CHWID; and
encrypting the node credentials with the new encryption CHWID, wherein the new encryption CHWID includes a new encryption data and a new encryption check code, the new encryption data reflects the configuration of the components of the node at a time when the new encryption CHWID is generated, and the new encryption check code corresponds to the new encryption data.

15. The method of claim 10, further comprising decrypting the node credentials with the encryption CHWID when it is determined that the difference between the encryption CHWID and the activation CHWID is tolerable.

16. The method of claim 10, further comprising:
determining whether the encryption CHWID should be reset when it is determined that the difference between the encryption CHWID and the activation CHWID is tolerable; and
decrypting the node credentials with the encryption CHWID when it is determined that the encryption CHWID should not be reset.

17. The method of claim 16, wherein in the act of determining whether the encryption CHWID should be reset, the determination is made based on whether or not a predetermined amount of time has passed since the encryption CHWID was previously set or reset.

18. The method of claim 16, wherein the activation check code corresponds to the activation data, the method further comprising:
setting the activation CHWID as a new encryption CHWID when it is determined that the encryption CHWID should be reset; and
encrypting the node credentials with the new encryption CHWID; and decrypting the node credentials with the new encryption CHWID.

19. The method of claim 16, wherein the activation check code does not correspond to the activation data, the method further comprising:
resetting the node license when it is determined that the encryption CHWID should be reset; and
decrypting the node credentials with a new encryption CHWID,
characterized in that the act of resetting the node license comprises:
determining the HWID of each of the one or more components of the node;
applying the translation algorithm to the HWIDs of the components to generate the new encryption CHWID; and
encrypting the node credentials with the new encryption CHWID, wherein the new CHWID includes a new encryption data and a new encryption check code, the new encryption data reflects the configuration of the components of the node at a time when the new encryption CHWID is generated, and the new encryption check code corresponds to the new encryption data.

20. A network node under a license, the network node configured to provide one or more services to a user device according to the license, the node comprising:
a license manager; and
one or more hardware components operatively connected to the license manager;
wherein the license manager is configured to generate an encryption combined hardware ID (CHWID) of the node and to encrypt credentials of the license with the encryption CHWID, the credentials include certificates used for authorization of the node to enable and disable features for the node, the encryption CHWID is generated from applying a translation algorithm to hardware IDs (HWIDs) of the node components and includes encryption data and an encryption check code, the encryption data reflects a configuration of the components of the node at a time when the encryption CHWID is generated, and the encryption check code corresponds to the encryption data.

21. The node of claim 20, wherein:
when the encryption check code is an error detection code, the encryption check code is at least one of a cyclic redundancy code, a checksum code, and a parity code based on the encryption data; and
when the encryption check code is an error correction code, the encryption check code is at least one of a forward error correction (FEC) code, a convolutional code, a block code, a Hamming code, a Reed-Solomon code, a BCH code, a linear code, and a Reed-Solomon code based on the encryption data.

22. The node of claim 20, wherein the license manager is configured to:
generate an activation CHWID of the node by applying the translation algorithm to hardware IDs (HWIDs) of the node components, the activation CHWID comprising activation data and an activation check code, the activation data reflecting the configuration of the components of the node at a time when the activation CHWID is generated and the activation check code corresponding to one of the activation data or the encryption data;
determine whether the encryption CHWID and the activation CHWID are equal;
decrypt the node credentials with the encryption CHWID when it determines that the encryption CHWID and the activation CHWID are equal;
determine whether a difference between the encryption CHWID and the activation CHWID is tolerable when it determines that the encryption CHWID and the activation CHWID are not equal;
reset the node license when it determines that the difference between the encryption CHWID and the activation CHWID is not tolerable;
decrypt the node credentials with the encryption CHWID and determine whether the encryption CHWID should be reset when it determines that the difference between the encryption CHWID and the activation CHWID is tolerable;
decrypt the node credentials with the encryption CHWID when it determines that the encryption CHWID should not be reset; and
reset the encryption CHWID when it determines that the encryption CHWID should be reset.

23. The node of claim 22, wherein:
   when the activation check code and the encryption check code are error detection codes, the license manager is configured to determine that the difference between the encryption CHWID and the activation CHWID is tolerable by determining whether the difference is within a predetermined tolerance range; and
   when the activation check code and the encryption check code are error correction codes, the license manager is configured to determine that the difference between the encryption CHWID and the activation CHWID is tolerable by applying an error correction algorithm to the activation CHWID to generate a revised CHWID and determining whether the encryption CHWID and the revised CHWID are equal.

24. The node of claim 22, wherein:
   the license manager is configured to reset the node license by generating a new encryption CHWID of the node and to encrypting the node credentials with the new encryption CHWID, wherein the new encryption CHWID is generated from applying the translation algorithm to the HWIDs of the node components and includes a new encryption data and a new encryption check code, the new encryption data reflects the configuration of the components of the node at a time when the new encryption CHWID is generated, and the new encryption check code corresponds to the new encryption data.

25. The node of claim 20, wherein the license manager is implemented as any combination of hardware, software and firmware.

* * * * *

UNITED STATES PATENT AND TRADEMARK OFFICE
CERTIFICATE OF CORRECTION

PATENT NO. : 8,775,793 B2  
APPLICATION NO. : 12/918333  
DATED : July 8, 2014  
INVENTOR(S) : Limber Page 1 of 1

It is certified that error appears in the above-identified patent and that said Letters Patent is hereby corrected as shown below:

In the Drawings

In Fig. 4, Sheet 4 of 8, for Tag "410", in Line 1, delete "DETEMINE" and insert -- DETERMINE --, therefor.

In Fig. 7, Sheet 7 of 8, for Tag "710", in Line 1, delete "DETEMINE" and insert -- DETERMINE --, therefor.

In the Specification

In Column 4, Line 47, delete "FIGS. 2A and 28" and insert -- FIGS. 2A and 2B --, therefor.

Signed and Sealed this  
First Day of September, 2015

Michelle K. Lee  
*Director of the United States Patent and Trademark Office*